United States Patent [19]

Tsutsumi et al.

[11] Patent Number: 4,824,908

[45] Date of Patent: Apr. 25, 1989

[54] BUTADIENE-BASED RUBBER COMPOSITION

[75] Inventors: Fumio Tsutsumi; Mitsuhiko Sakakibara; Noboru Shimada; Yoshihisa Fujinaga, all of Yokkaichi; Noboru Oshima, Suzuka; Tatsuro Hamada; Tatsuo Fujimaki, both of Higashimurayama, all of Japan

[73] Assignee: Japan Synthetic Rubber Co., Ltd., Tokyo, Japan

[21] Appl. No.: 29,558

[22] Filed: Mar. 24, 1987

[30] Foreign Application Priority Data

Mar. 24, 1986 [JP] Japan ................................. 61-64184

[51] Int. Cl.$^4$ ..................... C08L 7/00; C08L 9/00; C08L 9/06; C08L 53/02
[52] U.S. Cl. ............................................ 525/99; 525/95; 525/98; 525/236; 525/237; 525/332.9; 525/333.1; 525/333.2; 525/123; 525/125
[58] Field of Search ................. 525/123, 125, 237, 95, 525/98, 99, 332.9, 333.1, 333.2

[56] References Cited

U.S. PATENT DOCUMENTS

| | | | |
|---|---|---|---|
| 3,281,383 | 10/1966 | Zelinski et al. | 525/122 |
| 3,582,508 | 6/1971 | McIntosh, Jr. | 525/125 |
| 3,793,252 | 2/1974 | Corish et al. | 525/125 |
| 4,304,886 | 12/1981 | Bean, Jr. et al. | 525/123 |
| 4,430,448 | 2/1984 | Schaefer et al. | 525/125 |
| 4,436,859 | 3/1984 | Stein et al. | 525/123 |
| 4,581,092 | 4/1982 | Westley | 525/123 |
| 4,590,240 | 5/1986 | Streeter et al. | 525/123 |

*Primary Examiner*—Allan M. Lieberman
*Attorney, Agent, or Firm*—Sughrue, Mion, Zinn, Macpeak & Seas

[57] ABSTRACT

A butadiene-based rubber composition is disclosed, which contains not less than 20% by weight of a butadiene-based homopolymer or copolymer having a glass transition temperature (Tg) of not less than $-105°$ C., but less than $-70°$ C. and a Mooney viscosity ($ML_{1+4}$, 100° C.) of 10 to 150. The butadiene-based homopolymer or copolymer is obtained by polymerizing butadiene or random-copolymerizing butadiene with at least one kind of a monomer selected from the group consisting of another conjugated diene and an aromatic vinyl compound, and then reacting polymerization-active terminals thereof with an isocyanate compound and/or an isothiocyanate compound. The butadiene-based rubber composition has excellent resilience, fracture strength, and wear resistance as a vulcanizate as well as excellent processability as an unvulcanized rubber, and can be used as tire applications such as tire treads, undertreads, sidewalls, bead portions, etc. as well as vibration insulating rubber, hoses, belts and other industrial articles.

20 Claims, 2 Drawing Sheets

BUTADIENE-BASED RUBBER COMPOSITION

BACKGROUND OF THE INVENTION (1) Field of the Invention

The present invention relates to a butadiene based rubber composition having excellent resilience, fracture strength and wear resistance as a vulcanizate as well as excellent processability as an unvulcanizated rubber.

(2) Related Art Statement

Demands for low fuel consumption and safety in automobiles have recently been getting severer and severer, but conventional diene-based rubber materials do not satisfy both the characteristics of the low fuel consumption and the safety. Consequently, conjugated diene-based polymers having excellent resilience and fracture strength have been sought as tire rubber materials, particularly, rubber materials, such as, for tire treads.

Conventionally, as described in Japanese patent publication No. 4,996/69, U.S. Pat. No. 3,956,232, Japanese Patent Application Laid-open No. 205,414/82 and so on, these conjugated diene-based polymers have been obtained by polymerizing butadiene or copolymerizing butadiene with a vinyl aromatic compound such as styrene in a hydrocarbon solvent with use of an or9anic lithium initiator, and then reaching a resulting product with a halo9enated tin compound or an alkenyl tin compound.

However, since the above polymers have fracture strength, particularly poor fracture strength at high temperatures, they cannot satisfy severe performances required for the tire treads.

On the other hand, as rubber material having excellent fracture strength, there are natural rubber, synthetic polyisoprene rubber, etc., which are now widely and mainly used as tire treads for trucks and buses in service under a high load conditions. However, the above natural rubber and synthetic polyisoprene rubber have poorer resilience and wear resistance as compared with so-called lithium butadiene-based homopolymer (or copolymer) obtained by using the above organic lithium initiators. Consequently, improvement thereof has been strongly demanded.

SUMMARY OF THE INVENTION

The present invention has been made under the background of the technical problems of the above-mentioned prior art, and is to provide a butadiene-based rubber composition having excellent resilience, fracture strength and wear resistance as a vulcanizate as well as excellent processability as an unvulcanized rubber.

That is, an object of the present invention is to provide the butadiene-based rubber composition containing not less than 20% by weight of butadiene based rubber homopolymer (or copolymer) having a glass transition temperature (Tg) of not less than $-105°$ C. but less than $-70°$ C., and Mooney viscosity ($ML_{1+4}$, 100° C.) of 10-150, said butadiene-based rubber homopolymer (or copolymer) being obtained by polymerizing butadiene or copolymerizing butadiene with at least one kind of a monomer selected from another conjugated diene and an aromatic vinyl compound with use of an organic lithium initiator and then reacting polymerization-active terminals of a resulting homopolymer or copolymer with an isocyanate compound and/or an isothiocyanate compound.

The above and other objects, features and advantages of the invention will be appreciated upon reading of the invention when taken in conjunction with the attached drawings, with understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

The present invention will be explained in more detail with referring to the attached drawings, if necessary.

In the butadiene-based homopolymer (or copolymer) used in the present invention, the glass transition temperature is not less than $-105°$ C. but less than $-70°$ C., and preferably from $-100°$ C. to $-80°$ C. If the glass transition temperature is less than $-105°$ C., the processability is poor, while not less than $-70°$ C. is unfavorable, because the wear resistance of the vulcanizate of the resulting rubber composition is lower.

The glass transition temperature (Tg) is a value measured by a differential thermal analyzer (DSC). For example, the glass transition temperature of a lithium butadiene rubber containing 12% by weight of vinyl bonds, natural rubber, and emulsion polymerized styrene-butadiene rubber (manufactured by Japan Synthetic Rubber Co., Ltd.; #1500) under the same measuring conditions are $-108°$ C., $-76°$ C. and $-64°$ C., respectively.

Figure 1:
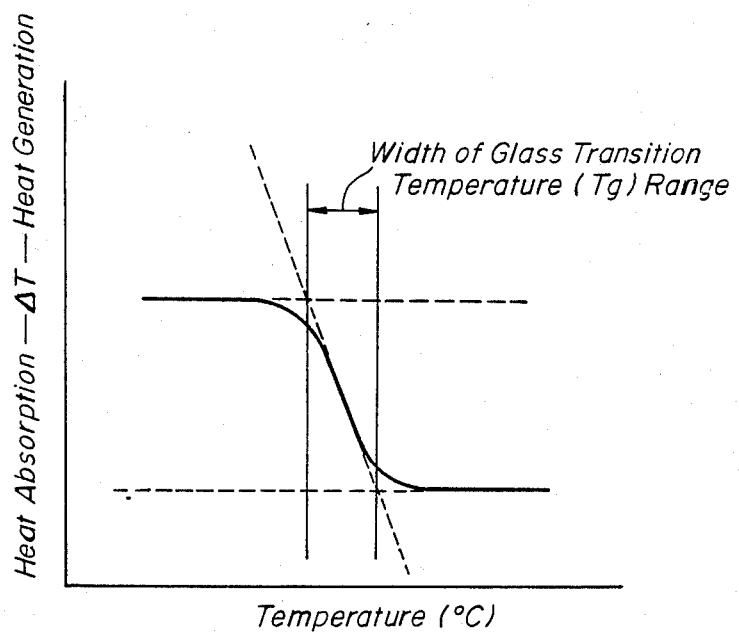
FIG. 1 is a diagram showing a width of a glass transition temperature (Tg) range determined from a DSC chart.

The width of the glass transition temperature (Tg) range determined by DSC shown in FIG. 1 is preferably 12° C. or higher, because balance between the tensile strength and the wear resistance is improved at that time. The width of the glass transition temperature (Tg) range is more preferably not less than 15° C.. The upper limit thereof is restricted to 70° C. from the manufacturing standpoint.

The width of the glass transition temperature (Tg) range can be adjusted by a composition distribution width of the content of bound styrene or the content of vinyl bonds in butadiene units in the styrene-butadiene copolymer (SBR). The copolymer having such a composition distribution width of the bound styrene or the vinyl bonds can be obtained by an adiabatic polymerization process or a polymerization process in which a monomer is intermittently or continuously added.

Further, the molecular weight of the butadiene-based homopolymer (or copolymer) according to the present invention is 10-150, preferably 20-120 and more preferably less than 60 in terms of Mooney viscosity ($ML_{1+4}$, 100° C.) as an indicator of the molecular weight. If the Mooney viscosity is less than 10, although the processability of the unvulcanized rubber is good, the resilience and the tensile strength of the vulcanizate are lowered. On the other hand, if it exceeds 150, the processability of the unvulcanized rubber is deteriorated so that the physical properties of the vulcanizate are not improved. The Mooney viscosity is preferably less than 60 from the standpoint of heat generation during processing and moldability during extrusion.

Although not specifically restricted, the content of vinyl bonds of the butadiene units in the butadiene-based copolymer according to the present invention is preferably not less than 16% by weight, and preferably not more than 40% by weight from the standpoint of the manufacturing and obtained effects. In particular, when the copolymer according to the present invention is a styrene-butadiene copolymer, the content of the vinyl bonds is preferably not less than 16% by weight, because the intended physical properties such as resilience, etc. are obtained at that content. That is, in this case, if the content of the vinyl bonds is less than 16% by weight, styrene is difficult to randomly copolymerize in the case of a batch polymerization system. In the case of the continuous polymerization system, random styrene-butadiene copolymer can be obtained, but a great amount of the low molecular weight component is contained. Thus, such contents are both unfavorable because the resilience is deteriorated.

The random copolymer is herein used to mean random copolymers which are obtained by, for instance, an oxidation decomposing method of I. M. Kolthoff, et al, in J. Polymer Sci. volume 1, page 426, 1946 applied to styrene-butadiene copolymers, with the blocked polystyrene content being not more than 10% by weight, preferably not more than 5% by weight of the entire bound styrene. The content of the blocked polystyrene exceeding 10% by weight is unfavorable, because the resilience of the vulcanizate is lowered.

The butadiene-based homopolymer (or copolymer) according to the present invention is obtained by solution polymerizing 1,3 butadiene alone or the above butadiene with at least one kind of a monomer selected from another conjugated diene and an aromatic vinyl compound in a hydrocarbon solvent by using an organic lithium initiator, and reacting an isocyanate compound and/or an isothiocyanate compound with a resulting homopolymer or copolymer.

In the above solution polymerization, use may be made of isoprene, pentadiene, etc. as "another conjugated diene", and styrene, vinyltoluene, α-methylstyrene, etc., preferably, styrene may be used as the "aromatic vinyl compound". In particular, the styrene-butadiene copolymer containing not less than 3% by weight, preferably not less than 5% by weight of the bound styrene is preferred, because it has excellent resilience, fracture strength and wear resistance as a vulcanizate as well as excellent processability as an unvulcanized rubber. Although not specifically restricted, the content of the bound styrene in the styrene-butadiene copolymer is not more than 50% by weight, preferably not more than 45% by weight.

As the hydrocarbon solvent, use may be made of pentane, hexane, heptane, cyclohexane, methylcyclohexane, benzene, toluene, xylene, and a mixture thereof. A use amount thereof is in a range of 1 to 20 parts by weight per 1 part by weight of the monomer.

As the organic lithium initiator, use may ordinarily be made of an organic lithium compounds. As such compounds, use may be made of, for instance, an alkyl lithium such as n-butyllithium, sec-butyllithium, t-butyllithium, phenyllithium, 1,4-dilithiobutane, or the like, or an organic lithium amide such as N-methylbenzyl lithium amide, dioctyllithium amide, etc. The use amount of the organic lithium compound is 0.02 to 0.3 part by weight, preferably 0.03 to 0.1 part by weight, with respect to 100 parts by weight of the monomer. In particular, a homopolymer (or copolymer) having excellent tensile strength can be obtained by copolymerizing a conjugated diene-based monomer under the combination of 1,4-dilithiobutane or alkylmonolithium with a polyfunctional monomer such as divinylbenzene and reacting terminals of a resulting polyfunctional polymer with an isocyanate compound and/or an isothiocyanate compound.

As the isocyanate compound, mention may be made of phenyl isocyanate, 2,4-tolylenediisocyanate, 2,6-tolylenediisocyanate, diphenylmethane diisocyanate, naphthalene diisocyanate, tolidine diisocyanate, triphenylmethane triisocyanate, p-phenylene diisocyanate, tris(isocyanate phenyl)thiophosphate, xylene diisocyanate, benzene-1,2,4-triisocyanate, naphthalane-1,2,5,7-tetraisocyanate, naphthalane-1,3,7-triisocyanate, phenyl isocyanate, hexamethylene diisocyanate, methylcyclohexane diisocyanate, isophorone diisocyanate, etc. Preferably, use may be made of an aromatic isocyanate or an aromatic triisocyanate, or dimers or trimers of a variety of aromatic isocyanate compounds, aromatic polyisocyanate compound such as adducts in which the above aromatic isocyanate is reacted with a polyol, or a polyamine. The aromatic polyisocyanate compounds such as 2,4-tolylenediisocyanate, diphenylenemethane diisocyanate, and naphthalene diisocyanate are more preferred.

As the isothiocyanate compound, use may be made of, for instance, allylisothiocyanate, rosin-5-isothiocyanate, ethylisothiocyanate, p-sulfophenyl sodium isothiocyanate, tetramethyl rhodamine isothiocyanate, naphthyl isothiocyanate, phenyl isothiocyanate, t-butylisothiocyanate, fluorene isothiocyanate, 3-fluorophenyl isothiocyanate, 4-fluorophenyl isothiocyanate, methylisothiocyanate, rhodamine B isothiocyanate, phenyl-1,3-diisothiocyanate phenyl- 1,3,5-triisothiocyanate, etc. Preferably, an aromatic isothiocyanate compound, or an aromatic polyisothiocyanate compound is used.

These isocyanate compounds or isothiocyanate compounds can be used singly or two or more kinds of these compounds may be used in combination.

Further, the isocyanate compound and/or the isothiocyanate compound are used in a total amount of 0.1 to 10 equivalents, preferably 0.5 to 4 equivalents, more preferably 1 to 3 equivalents in terms of isocyanate groups or isothiocyanate groups with respect to 1 mole of lithium atoms. If the use amount is outside the above range, effect of improving the resilience and the tensile strength cannot be obtained.

The polymerization (copolymerization) reaction using such an organic lithium initiator is effected at a polymerization temperature range of 0° to 120° C., preferably 20° to 100° C. under an isothermic conditions or a temperature-rising conditions. The polymerization (copolymerization) system may be either a batch polymerization system or a continuous polymerization system. At that time, the monomer may be continuously or intermittently added in a divided fashion on the way of the polymerization (copolymerization) reaction.

When the polymerization conversion exceeds 50%, preferably 90%, the isocyanate compound and/or the isothiocyanate compound is added to be reacted with polymerization-active terminals of living polymer of the butadiene-based homopolymer (or copolymer). The above-mentioned reaction temperature is from 40° to 120° C., preferably 50° to 100° C.

In the polymerization or the copolymerization, tetrahydrofuran, dimethoxybenzene, ethylene glycol dimethyl ether, ethylene glycol dibutyl ether, N,N,N',N'-tetramethylethylenediamine, or triethylenediamine, an ether such as a potassium salt of isoamyl alcohol, a potassium salt of butyl alcohol, or a potassium salt of dodecyl benzene sulfonic acid; a tertiary amine and its potassium salt, etc. may be added to obtain a random structure or adjust the microstructure of the butadiene units.

the, content of the butadiene in the butadiene-based homopolymer (or copolymer) according to the present invention is preferably not less than 30% by weight from the standpoint of the tensile strength.

It is necessary that the butadiene-based homopolymer (or copolymer) according to the present invention is contained in an amount of not less than 20% by weight, preferably not less than 30% by weight with respect to 100 parts by weight of the rubber material of the rubber composition according to the present invention. If the content is less than 20% by weight, the rubber composition having intended excellent resilience, fracture strength, and wear resistance as the vulcanizate as well as excellent processability as the unvulcanized rubber cannot be obtained.

The rubber composition according to the present invention includes the above-mentioned butadiene-based homopolymer (or copolymer) as an indispensable component, and is used in such a state that the butadiene-based homopolymer (or copolymer) is blended with one or more kinds of rubbers selected from natural rubber, high cispolyisoprene, emulsion polymerized styrene-butadiene copolymer, other solution polymerized styrene-butadiene copolymer containing 10-40% by weight of bound styrene and 10-80% by weight of vinyl units, high cispolybutadiene obtained by using a catalyst such as nickel, cobalt, titanium, or neodymium, ethylene-propylene-diene terpolymer, halogenated butyl rubber, and halogenated ethylene-propylene diene terpolymer. Among them, according to the present invention, the most preferable physical properties can be obtained in a rubber composition containing not less than 20% by weight of each of the butadiene-based homopolymer (or copolymer) used in the present invention and natural rubber. The blending amount of natural rubber in the butadine based rubber composition according to the present invention is preferably 20 to 70% by weight from the standpoint of balancing the processability, tensile strength and resilience.

If necessary, oil extended rubber, or an oil extender such as an aromatic process oil, naphthanic process oil, etc. may be compounded into the rubber composition according to the present invention together with other various compounding agents and a vulcanizer.

The butadiene-based rubber composition according to the present invention is vulcanized with addition of ordinary compounding agents used in vulcanized rubbers, and can be used in tire applications such as treads, under treads, sidewalls, bead portions, etc. as well as vibration-insulating rubber, hoses, belts and other industrial articles.

Isocyanate-modified groups or isothiocyanate-modified groups are introduced into the terminals of the butadiene-based homopolymer (or copolymer) used in the rubber composition according to the present invention by reacting lithium atoms at the terminals of the homopolymer (or copolymer) with the isocyanate compounds and/or the isothiocyanate compound. By so doing, the butadiene based rubber composition having excellent resilience, fracture strength and wear resistance as vulcanizate as well as excellent processability as the unvulcanized rubber can be obtained.

The present invention will be more specifically explained by way of examples, but the invention should not be interpreted to be limited thereto unless not derived from the spirit of the invention. "Part" and "%" in Examples and Comparative Examples are based on "weight" unless otherwise specified.

Various measurements in Examples and Comparative Examples were made as follows:

That is, the microstructure (the content of the vinyl bonds) in the butadiene units was determined by an infrared method (Morero's method). The content of the bound styrene was measured with respect to a preliminarily determined calibration curve by an infrared method based on an absorption of phenyl groups at 699 $cm^{-1}$. The content of blocked polystyrene was measured by the above-mentioned oxidation decomposition method of Kolthoff et al. The Mooney viscosity ($ML_{1+4}$, 100° C.), was measured at a temperature of 100° C. for a preliminary heating time of 1 minute and a measuring time of 4 minutes. A tensile strength was measured by JIS K6301. The resilience was measured at 50° C. by using a Dunlop tripsometer. The wear resistance was measured by using Pico type abrasion machine. A processability was evaluated at ten grades with respect to a roll retention, heat generation during kneading, and extrusion processability (shape, speed) in the kneaded rubber. (The larger the figure, the more excellent the processability).

Examples 1-7 and Comparative Examples 1-6

Production of Copolymer A:

After 2,000 g of cyclohexane, 100 g of styrene and 100 g of 1,3-butadiene in a deaerated state were charged into an autoclave having an inner volume of 5 liters, 2 g of tetrahydrofuran and 0.36 g of n-butyllithium were added thereto. Then, polymerization was started at a temperature of 50° C. Immediately after the polymerization was started, 300 g of 1,3-butadiene was further continuously added in 2 hours.

Two hours later, the polymerization conversion reached 99%.

The polymerization was a temperature-rising polymerization from 50° to 80° C. After the termination of the polymerization, 0.5 g of diphenylmethane diisocyanate was added at 70° C. to effect a coupling reaction.

Molecular characteristics of a thus obtained Copolymer A are shown in Table 1.

Production of Polymer (Copolymer) B-Q:

By the same method as in Copolymer A, the polymerization and the coupling reaction were carried out to obtain Polymer (Copolymer) B-Q.

Figure 2:
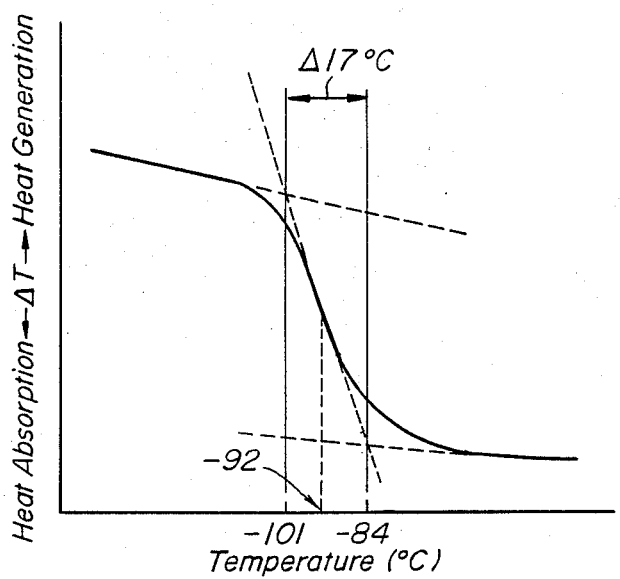
FIG. 2 is a diagram showing a width of the glass transition temperature (Tg) range of Copolymer D.
Figure 3:
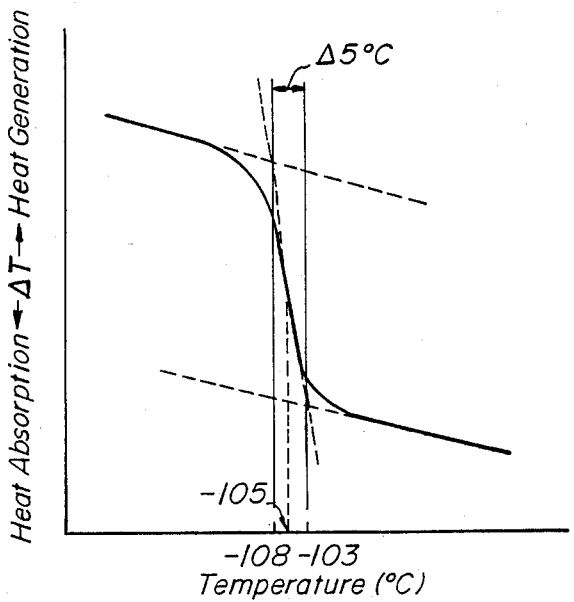
FIG. 3 is a diagram showing a width of a glass transition temperature (Tg) range of a Polymer H.

Molecular characteristics of thus obtained Polymer (Copolymer) B-Q are shown in Table 1. With respect to Polymer (Copolymer) D and H, the widths of the glass transition temperature (Tg) ranges are shown in FIG. 2 (Copolymer D) and FIG. 3 (Polymer H), respectively.

Formation of rubber compositions:

With respect to the thus obtained polymer (or Copolymer) A-Q, rubber ingredients were kneaded at a compounding recipe shown in Table 2, and vulcanized under conditions of 145° C.×30 minutes. The processability of unvulcanized rubbers and physical properties of vulcanizates are shown in Table 3.

As is obvious from Table 3, the rubber compositions according to the present invention are better in processability and possesses better balanced physical properties as compared with the Comparative Examples.

TABLE 1(a)

| Polymer (copolymer) | Bound styrene content (%) | Block poly-styrene content (%) | Vinyl bond content (%) | Mooney viscosity | Tg*1 (°C.) | Coupling agent (equivalent of isocyanate groups relative to lithium atoms) |
|---|---|---|---|---|---|---|
| A | 20 | 3 | 17 | 41 | −92 (18) | diphenylmethane isocyanate (1.0) |
| B | 25 | 5 | 15 | 40 | −87 (20) | diphenylmethane isocyanate (1.0) |
| C | 10 | 1 | 18 | 42 | −98 (12) | diphenylmethane isocyanate (1.0) |
| D | 20 | 3 | 17 | 42 | −92 (17) | polymeric type diphenyl-methane diisocyanate (1.0) |
| E | 20 | 3 | 17 | 40 | −91 (16) | polymeric type diphenyl-methane diisocyanate (2.5) |
| F | 20 | 3 | 17 | 42 | −92 (17) | tolylene diisocyanate (2.0) |
| G | 20 | 3 | 17 | 43 | −91 (18) | hexamethylene diisocyanate (1.0) |
| H | 0 | 0 | 18 | 42 | −105 (5) | polymeric type diphenyl-methane diisocyanate (1.0) |
| I | 40 | 7 | 16 | 45 | −60 (30) | polymeric type diphenyl-methane diisocyanate (1.0) |
| J | 20 | 1 | 40 | 40 | −68 (10) | polymeric type diphenyl-methane diisocyanate (1.0) |
| K | 20 | 3 | 17 | 42 | −91 (16) | not added |

TABLE 1(b)

| Polymer (copolymer) | Bound styrene content (%) | Block poly-styrene content (%) | Vinyl bond content (%) | Mooney viscosity | Tg*1 (°C.) | Coupling agent (equivalent of isocyanate groups relative to lithium atoms) |
|---|---|---|---|---|---|---|
| L | 20 | 2 | 17 | 41 | −92 (16) | silicon tetrachloride (1.0)*2 |
| M | 20 | 9 | 13 | 40 | −95 (19) | diphenylmethane diisocyanate (1.0) |
| N | 20 | 3 | 16 | 41 | −90 (8) | diphenylmethane diisocyanate (1.0) |
| O | 20 | 3 | 17 | 45 | −92 (18) | phenyl-1,3-diisocyanate (1.0) |
| P | 20 | 3 | 17 | 55 | −92 (18) | polymeric type diphenyl-methane diisocyanate (1.0) |
| Q | 20 | 3 | 17 | 65 | −92 (18) | polymeric type diphenyl-methane diisocyanate (1.0) |

*1 Figures in parentheses denote widths of glass transition (Tg) ranges
*2 Equivalent of chlorine atoms relative to lithium atoms

TABLE 2

(Compounding recipe)

| | (part by weight) |
|---|---|
| Polymer | 100 |
| HAF carbon | 50 |
| Stearic acid | 2 |
| Zinc oxide | 3 |
| Antioxidant 810NA*3 | 1 |
| Vulcanization accelerator CZ*4 | 0.6 |
| Vulcanization accelerator M*5 | 0.6 |
| Vulcanization accelerator D*6 | 0.4 |
| Sulfur | 1.5 |

*3 N—phenyl-N—isopropyl-p-phenylenediamine
*4 N—cyclohexyl-2-benzothiazylsulfenamide
*5 2-mercaptobenzothiazole
*6 1,3-diphenylguanidine

TABLE 3(a)

| | Polymer (copolymer) | Natural rubber | BR*7 | Elongation (%) | Tensile strength (kgf/cm²) | Resilience (%, 50° C.) | Wear resistance | Processability |
|---|---|---|---|---|---|---|---|---|
| Example 1 | A (70) | 30 | — | 420 | 270 | 71 | 125 | 9 |
| Example 2 | B (70) | 30 | — | 430 | 275 | 71 | 120 | 10 |
| Example 3 | C (70) | 30 | — | 400 | 260 | 73 | 130 | 8 |
| Example 4 | D (70) | 30 | — | 420 | 272 | 71 | 125 | 9 |
| Example 5 | E (70) | 30 | — | 430 | 275 | 72 | 125 | 9 |
| Example 6 | F (70) | 30 | — | 420 | 268 | 71 | 125 | 9 |
| Example 7 | G (70) | 30 | — | 410 | 267 | 70 | 120 | 9 |
| Example 8 | E (100) | — | — | 420 | 260 | 73 | 135 | 8 |
| Example 9 | E (70) | 20 | 10 | 400 | 260 | 73 | 140 | 9 |
| Example 10 | H (70) | 30 | — | 390 | 245 | 74 | 145 | 7 |
| Example 11 | M (70) | 30 | — | 410 | 270 | 69 | 120 | 9 |
| Example 12 | N (70) | 30 | — | 420 | 272 | 71 | 115 | 9 |
| Example 13 | O (70) | 30 | — | 420 | 265 | 72 | 125 | 9 |

(Polymer compounding ratio (part))

TABLE 3(b)

| | Polymer compounding ratio (part) | | | Elongation (%) | Tensile strength (kgf/cm²) | Resilience (%, 50° C.) | Wear resistance | Processability |
|---|---|---|---|---|---|---|---|---|
| | Polymer (copolymer) | Natural rubber | BR*7 | | | | | |
| Example 14 | D (40) | 60 | — | 440 | 280 | 72 | 120 | 10 |
| Example 15 | P (70) | 30 | — | 410 | 275 | 73 | 135 | 7 |
| Example 16 | Q (70) | 30 | — | 400 | 270 | 73 | 135 | 5 |
| Example 17 | E (70) | 10 | 20 | 390 | 250 | 73 | 140 | 7 |
| Comparative Example 1 | I (70) | 30 | — | 420 | 275 | 69 | 105 | 10 |
| Comparative Example 2 | J (70) | 30 | — | 410 | 265 | 71 | 105 | 9 |
| Comparative Example 3 | K (70) | 30 | — | 400 | 255 | 70 | 115 | 6 |
| Comparative Example 4 | L (70) | 30 | — | 410 | 265 | 69 | 115 | 9 |
| Comparative Example 5 | A (15) | 45 | 40 | 400 | 255 | 70 | 115 | 10 |
| Comparative Example 6 | SBR*8 (100) | — | — | 410 | 265 | 66 | 100 | 9 |

*7Butadiene manufactured by Japan Synthetic Rubber Co., Ltd. (trade name, BR01)
*8Emulsion polymerized styrene-butadiene rubber manufactured by Japan Synthetic Rubber Co., Ltd. (trade name: #1500)

The butadiene-based rubber compositions according to the present invention have excellent resilience, fracture strength, and wear resistance as the vulcanizates as well as excellent processability as the unvulcanized rubber, and can be used as tire applications such as treads, undertreads, sidewalls, bead portions, etc. as well as vibration-insulating rubber, hoses, belts and other industrial articles after vulcanization with the addition of ordinary compounding agents used in vulcanized rubbers.

What is claimed is:

1. A butadiene-based rubber composition containing not less than 20% by weight of a butadiene-based homopolymer or copolymer having a glass transition temperature (Tg) of not less than −105° C. but less than −70° C. and a Mooney viscosity ($ML_{1+4}$, 100° C.) of 10 to 150, wherein said butadiene-based homopolymer or copolymer is obtained by:
   (A) (i) polymerizing butadiene or (ii) random copolymerizing butadiene with at least one kind of a monomer selected from the group consisting of another conjugated diene and an aromatic vinyl compound, using an organic lithium initiator, and
   (B) then reacting the polymerization-active terminals thereof with, as a coupling agent, an isocyanate compound or an isothiocyanate compound.

2. A butadiene-based rubber composition according to claim 1 wherein the aromatic vinyl compound is styrene.

3. A butadiene-based rubber composition according to claim 1 wherein the isocyanate compound is an aromatic polyisocyanate compound and the isothiocyanate compound is an aromatic isothiocyanate compound.

4. A butadiene-based rubber composition according to claim 2 wherein the isocyanate compound is an aromatic polyisocyanate compound and the isothiocyanate compound is an aromatic isothiocyanate compound.

5. A butadiene-based rubber composition according to claim 1, wherein the content of vinyl bonds in the butadiene units is not less than 16% by weight, the content of bound styrene is not less than 3% by weight, and the width of the glass transition temperature (Tg) range is not less than 12° C.

6. A butadiene-based rubber composition according to claim 2, wherein the content of vinyl bonds in the butadiene units is not less than 16% by weight, the content of bound styrene is not less than 3% by weight, and the width of the glass transition temperature (Tg) range is not less than 12° C.

7. A butadiene-based rubber composition according to claim 3, wherein the content of vinyl bonds in the butadiene units is not less than 16% by weight, the content of bound styrene is not less than 3% by weight, and the width of the glass transition temperature (Tg) range is not less than 12° C.

8. A butadiene-based rubber composition according to claim 4, wherein the content of vinyl bonds in the butadiene units is not less than 16% by weight, the content of bound styrene is not less than 3% by weight, and the width of the glass transition temperature (Tg) range is not less than 12° C.

9. A butadiene-based rubber composition according to claim 1, which contains not less than 20% by weight of natural rubber.

10. A butadiene-based rubber composition according to claim 2, which contains not less than 20% by weight of natural rubber.

11. A butadiene based rubber composition according to claim 3, which contains not less than 20% by weight of natural rubber.

12. A butadiene based rubber composition according to claim 4, which contains not less than 20% by weight of natural rubber.

13. A butadiene-based rubber composition according to claim 5, which contains not less than 20% by weight of natural rubber.

14. A butadiene-based rubber composition according to claim 6, which contains not less than 20% by weight of natural rubber.

15. A butadiene-based rubber composition according to claim 7, which contains not less than 20% by weight of natural rubber.

16. A butadiene-based rubber composition according to claim 8, which contains not less than 20% by weight of natural rubber.

17. A butadiene-based rubber composition according to claim 1, wherein said organic lithium initiator is used in an amount of 0.02 to 0.3 parts by weight with respect to 100 parts by weight of the monomer.

18. A butadiene-based rubber composition according to claim 1, wherein said isocyanate compound or isothiocyanate compound is employed in an amount of 0.1 to 10 equivalents in terms of the isocyanate groups or isothiocyanate groups with respect to 1 mole of lithium atoms.

19. A butadiene-based rubber composition according to claim 18, wherein said isocyanate compound or isothiocyanate compound is employed in an amount of 0.5 to 4 equivalents in terms of the isocyanate groups or isothiocyanate groups with respect to 1 mole of lithium atoms.

20. A butadiene-based rubber composition according to claim 19, wherein said isocyanate compound or isothiocyanate compound is employed in an amount of 1 to 3 equivalents in terms of the isocyanate groups or isothiocyanate groups with respect to 1 mole of lithium atoms.

* * * * *